No. 815,541. PATENTED MAR. 20, 1906.
F. T. LEATHERMAN.
NUT LOCK.
APPLICATION FILED APR. 17, 1905.
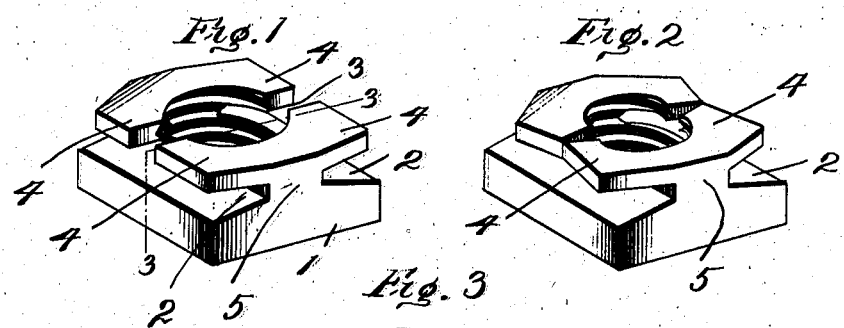
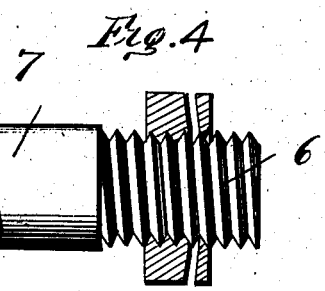
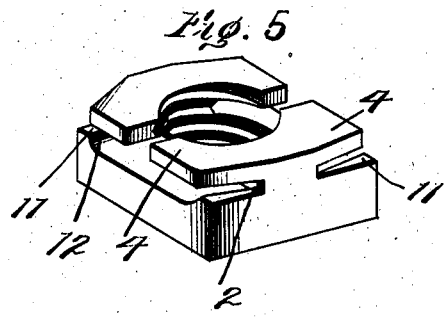
Inventor
F. T. Leatherman.
Witnesses
W. R. Taylor,
S. W. Fitzgerald
By W. T. Fitzgerald
Attorneys

UNITED STATES PATENT OFFICE.

FRANKLIN T. LEATHERMAN, OF WHITING, INDIANA, ASSIGNOR OF ONE-HALF TO CHARLES E. GREENWALD, OF WHITING, INDIANA.

NUT-LOCK.

No. 815,541.     Specification of Letters Patent.     Patented March 20, 1906.

Application filed April 17, 1905. Serial No. 255,995.

*To all whom it may concern:*

Be it known that I, FRANKLIN T. LEATHERMAN, a citizen of the United States, residing at Whiting, in the county of Lake and State of Indiana, have invented certain new and useful Improvements in Nut-Locks; and I do hereby declare the following to be a full, clear, and exact description of the invention, such as will enable others skilled in the art to which it appertains to make and use the same.

My invention relates to securing devices, and more particularly to a nut-lock designed for reliably locking the nut upon its bolt so that it cannot casually come off of the same; and my invention consists of certain novel features of combination and construction of parts, the preferred form whereof will be hereinafter clearly set forth, and pointed out in the claims.

The prime object of my invention, among others, is to provide a nut which when turned home upon the bolt will impinge upon the bolt in a reliably efficient manner and which will absolutely remove the possibility of casual displacement thereof as incident to the jar and rattle of machinery.

Other objects and advantages will be hereinafter made clearly apparent, reference being had to the accompanying drawings, which are considered a part of this application, and in which—

Figure 1 shows a perspective view of my invention complete ready for use. Fig. 2 is a similar view showing the securing devices or wings upon the nut as bent into place to impinge upon the bolt. Fig. 3 is a sectional view of Fig. 1 as taken on line 3 3 thereof. Fig. 4 shows a sectional view of my nut upon the end of the bolt. Fig. 5 shows a perspective view of a slightly-modified construction from that presented in the other views.

For convenience of description the various details of my invention and accessories designed to coöperate therewith will be designated by numerals, the same numeral applying to a similar part throughout the several views, and, referring to the numerals on the drawings, 1 designates the body portion or nut proper, and upon opposite sides thereof I form the cleft or slot 2, and at right angles to said slots or clefts I form the vertically-disposed slotted opening 3, thereby leaving upon the outer portion of the nut four wing-like members, (designated by the numeral 4,) said wings being connected to the main body portion or nut proper by the neck-like member 5. The nut is provided with a threaded aperture, as is common, for the purpose of receiving the threaded terminal 6 of the bolt 7, when, by bending the free ends of the members 4 inward against the face of the nut, as shown in Fig. 2, the threaded faces of said terminals or wings 4 will be brought in tight engagement with a contiguous part of the bolt and securely hold the nut against rotation thereon. Moreover, the threaded face of the wing-like members 4 will by the bending process become more or less disalined and out of proper relationship to the threads upon the bolt, and as the tensile properties of the wing members will hold them in an adjusted position it follows that the nut cannot casually slip off of the bolt.

In Figs. 4 and 5 I have shown substantially the same construction as that presented in Figs. 1 and 2, except that the recesses 2 are increased in thickness near their middle portions, whereby the corner-walls or ribs 11 will be formed, the face of said ribs being to cause the outer edges of the locking wings or members 4 to ride down the inclined face 12 of the ribs 11, and thus cause the extreme free ends of said wings to move sharply inward against a contiguous part of the bolt and at the same time disaline the inner threaded edge of each wing 4 relative to the threads upon the bolt, and when said wings have thus been directed inward it will be found that the nut will be very reliably anchored upon the bolt and cannot casually come off of the same incident to the rattle and jar of machinery or when the nut is used for locking fish-plates, as upon railway-track rails.

The construction of my nut-lock is comparatively simple in character, inasmuch as but a few easily-formed slots or clefts are provided, said clefts extending into the threaded hole of the nut, leaving only a portion or neck 5 to hold the wings in position upon the nut proper. Therefore my nut-lock can be very cheaply and expeditiously manufactured, and believing that the advantages, construction, and manner of using my invention have thus been made clearly apparent further description is deemed unnecessary;

Having thus fully described my invention, what I claim as new, and desire to secure by Letters Patent, is—

1. A nut-lock comprising a body having slots in opposite sides thereof extending throughout the width of the body, said slots being open at their ends and parallel with one face of the nut, controlling-ribs disposed within the open ends of the slots, and said body having slots in one face thereof connecting with the first-mentioned slots, all of said slots opening into the threaded passage within the nut.

2. A nut-lock comprising a body having slots in opposite sides thereof extending throughout the width of the body, said slots having open ends and being parallel with one face of the nut, and slots in one face of the nut connecting with the first-mentioned slots at the centers thereof, all of said slots opening into the threaded passage within the nut.

In testimony whereof I have signed my name to this specification in the presence of two subscribing witnesses.

FRANKLIN T. LEATHERMAN.

Witnesses:
CHARLES E. GREENWALD,
FRANK W. LEWIS.